United States Patent Office 3,227,012
Patented Jan. 4, 1966

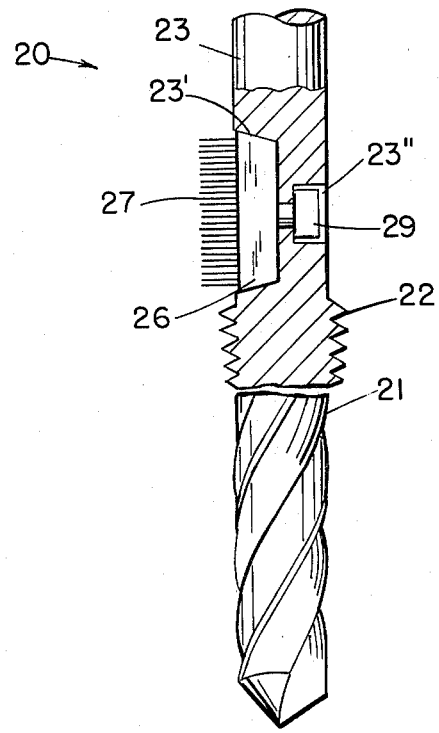

3,227,012
COMBINATION TOOLS
Jerome H. Lemelson, 85 Rector St., Metuchen, N.J.
Original application Dec. 24, 1954, Ser. No. 477,467.
Divided and this application Apr. 29, 1963, Ser. No. 276,621
9 Claims. (Cl. 77—65)

This invention relates to tools for performing plural operations on a workpiece and is a division of my copending application Serial Number 477,467, which was filed on December 24, 1954, and now abandoned.

It is a primary object of this invention to provide new and improved combination tools applicable for performing a plurality of operations on a workpiece during a single stroke or movement of the tool through the workpiece.

Another object is to provide a combinational tool including a drill having a further portion for performing a secondary operation on a workpiece during or immediately following the cutting of a hole in the workpiece by said drill.

Another object is to provide an automatic tool apparatus including a cutting tool comprising a drill portion and a secondary cutting portion situated beyond said drill portion for providing a secondary operation on the work machined by the drill portion, such as deburring or clearing material from the wall of the hole formed by the drill portion.

With the above and other such objects in view, as may hereinafter more fully appear, the invention consists of the novel construction, combination and arrangement of parts as will hereinafter be more fully described, and illustrated in the accompanying drawing wherein is shown an embodiment of this invention.

The figure is a side view in partial cross section of a combinational drill, tap, and deburring tool.

The figure illustrates a portion of a cutting tool applicable to the tools hereinabove described which includes a drill portion 21, a tapping portion 22 formed of the shank 23 of the drill portion and having means disposed beyond the tapping portion for cleaning and/or deburring the hole so tapped by further longitudinal movement of the tool. A slotted hole 23' is provided in the upper portion of shank 23 which receives a plug or strip 26 of similar shape having a plurality of filament element 27 of steel wire or the like protruding outward therefrom a degree beyond the extremities of the teeth 22' of the tapping section 22. Rotation of 23 as it is moved longitudinally through the hole just tapped will thus cause the elements 27 to engage and deburr or clean the threads just tapped. A screw 29 passing through a hole 23" in shank 23 is received in a threaded hole in 28 in member 26 and is utilized to retain said member 26 in the slotted hole 23' in 23. Other constructions applicable to the device of the figure include forming the outer surface of member 11 with a plurality of tapered projections which are operative to clear the threaded hole machined by portion 22 as 23 is rotated and advanced by the controlled movement of its chuck or by providing means other than brush-like filaments 27 to effect said deburring or cleaning operations.

The device illustrated in the figure may be applied along the shanks of any suitable drilling or tapping means such as those described in my application Serial Number 477,467. For example, it may be applied to the end of the drill anywhere along the shank thereof, the areas between the serrated tap formations of a tap or between the portions of a milling cutter.

As many apparently widely different embodiments of this invention may be made without departing from the spirit and scope hereof, it is to be understood that the invention is not limited to the specific embodiments thereof except as defined in the appended claims.

I claim:
1. A combination tool comprising a plurality of operating portions each adapted to perform a selected operation on a workpiece, said operating portions being aligned on a common axis to provide a unitary structure, a first of said operating portions have plural cutting edges disposed about a shank defining said axis and operative for cutting at least a portion of the wall of a hole in a workpiece, a hole in said shank, and a deburring tool means disposed within said shank hole for positioning said deburring tool, said deburring tool having at least one work portion which protrudes outwardly from said shank and is operative to rotate with said shank and engage burrs formed along the wall of the hole cut in the work by said plural cutting edges of said first operating portions and to remove said burrs therefrom during a single pass of said tool through said work.

2. A combination tool in accordance with claim 1, the work portion of said deburring tool having a plurality of cutting edges disposed beyond the shank of said first operating portion of said combination tool and operative to engage and deburr the hole cut in said workpiece by said first operating portion.

3. A combination tool in accordance with claim 1, said means disposed within said shank hole comprising at least one fastener operative to secure said deburring tool to said shank.

4. A combination tool in accordance with claim 1, said means disposed within said shank hole for positioning said deburring tool including a base portion of said deburring tool shaped to conform to the walls of said shank hole, and means for securing said base portion within said shank hole.

5. A combination tool in accordance with claim 1, said deburring tool including at least one cantilevered, flexible element secured to said shank in a position to engage burrs formed by said cutting edges of said first operating portion of said tool and to remove said burrs therefrom by tearing off said burrs.

6. A combination tool in accordance with claim 1, said deburring tool comprising a base, a plurality of flexible cantilevered elements secured to said base, said base secured to the shank of said first operating portion with said cantilevered elements projecting radially outward therefrom and operative to engage and remove burrs from the wall of a hole formed by the plural cutting edges of said first operating portion of said tool.

7. A combination tool in accordance with claim 6, said cantilevered elements being lengths of stiff wire extending along substantially the length of said base and protruding radially outward from said shank of said tool along a portion of the length thereof.

8. A combination tool in accordance with claim 1, wherein said hole in said shank is slotted and situated above said cutting edges of said first portion of said tool.

9. A combination tool in accordance with claim 8, said hole in said shank being slotted and extending longitudinally along said shank, said deburring tool comprising plural deburring elements disposed in said elongated hole and projecting outwardly therefrom.

References Cited by the Examiner
UNITED STATES PATENTS

| | | | |
|---|---|---|---|
| 410,614 | 9/1889 | Steiner | 77—65 X |
| 534,881 | 2/1895 | Hearne et al. | 77—65 X |
| 1,643,679 | 9/1927 | Roderick | 77—66 |
| 1,826,323 | 10/1931 | Mueller | 77—65 X |
| 2,362,260 | 11/1944 | Foster | 77—66 |
| 2,486,363 | 10/1949 | Purvis | 77—65 |

WILLIAM W. DYER, JR., *Primary Examiner.*

FRANCIS S. HUSAR, *Examiner.*